United States Patent Office 2,985,614
Patented May 23, 1961

2,985,614
COMPOSITION COMPRISING A PHENOLIC NOVOLAK, A PHENOLIC RESOL, AND DIALLYL PHTHALATE

Elvin M. Bright, North Hollywood, Calif., assignor to Air Logistics Corporation, a corporation of Delaware No Drawing. Filed May 1, 1958, Ser. No. 732,122

5 Claims. (Cl. 260—43)

This invention relates to an improved phenol formaldehyde resin formulation and to the method for making same, and more particularly to a phenol formaldehyde resin composition having characteristics suitable to the manufacture of pre-impregnated glass fiber sheet stock.

The present application is a continuation-in-part of my copending application, Serial No. 682,173, filed September 5, 1957, now abandoned, entitled Apparatus for and Method of Removing Water From Phenol Resins, and of my copending application, Serial No. 732,323, filed May 1, 1958, entitled Reinforced Continuous Sheeting and the Method and Apparatus for Making Same.

An object of this invention is the provision of a thermosetting resin composition which is a viscous solid material at room temperature, which may be heated to a free flowing liquid state on the application of heat insufficient to cause polymerization, and which may be stored without deleterious effects for extended periods at room temperatures.

Another object of this invention is the provision of a thermosetting resin utilizing diallyl phthalate monomer in combination with a phenol formaldehyde resin preparation.

Still another object of this invention is the provision of a method for manufacturing a low water content phenol formaldehyde resin blend which blend is a solid at room temperature, may be softened to a free flowing liquid state on the application of heat insufficient to polymerize the resin, and which may be stored at room temperature for extended periods without deleterious effects.

Still another object of this invention is the provision of a low water content phenol formaldehyde resin composition suitable for use in the fabrication of pre-impregnated glass fiber sheets.

A further object of this invention is the provision of a low water content phenol formaldehyde thermosetting resin composition which may be utilized in a hot melt solution, in the absence of water or other solvents, in the fabrication of pre-impregnated laminating sheet stock.

Other objects and advantages reside in the particular chemical constituents employed, the combination thereof, and the method of manufacture as will become more apparent from the following description.

In recent years, pre-impregnated glass fiber sheets have attracted considerable attention in the plastics industry. These sheets comprise a glass fiber sheet impregnated with a thermosetting resin, the resin being a solid at room temperatures, which is polymerizable upon the application of heat and pressure. Since the resin is a solid at room temperature, the sheet stock is easily handled in sheet form and, since the resin and glass fibers in this sheet may be pre-mixed in optimum proportions before delivery to the fabricator, the fabricator may laminate or otherwise form the pre-impregnated sheets in any desired manner with the application of heat and pressure without going through tedious mixing and hand lay-up operations.

Such pre-impregnated glass fiber sheet stock has previously been manufactured by diluting unpolymerized thermosetting resin material with a suitable solvent to obtain a free-flowing liquid resin composition, coating, spraying or otherwise applying the liquid resin to a glass fiber sheet, then extracting the solvent from the pre-impregnated sheets. In the particular case where the pre-impregnated resin is a phenol formaldehyde resin, water is the most commonly used solvent. However, since moisture is known to have a deleterious effect on glass fibers and, since in the presence of moisture a relatively poor glass fiber to resin bond is obtained, phenol formaldehyde pre-impregnated sheet stock has met with little commercial success.

It has been found that the addition of diallyl phthalate monomer to a phenol formaldehyde resin composition imparts characteristics to the resin composition which make it particularly well suited for use in pre-impregnating glass fiber sheets. For example, it has already been indicated that water present in the phenol formaldehyde resin has a deleterious effect when the resin is to be utilized in the preparation of pre-impregnated glass fiber sheet stock. In a thermosetting resin formulated with a phenol formaldehyde novolak and aqueous trimethylolphenol, the addition of diallyl phthalate to the trimethylolphenol component enables rapid and efficient dehydration of the trimethylolphenol such that a low water content phenol formaldehyde resin blend may be prepared.

In addition to facilitating water extraction, the diallyl phthalate is found to retard advancement of the resin blend thereby permitting the resin blend to be handled at elevated temperatures in the range of 150° F. in a hot melt system without excessive advancement. Phenol formaldehyde resin preparations which are of low water content and which may be utilized in a hot melt in this temperature range without substantial deleterious advancement of the resin have heretofore been unknown.

The following describes the manufacture of a phenol formaldehyde resin in accordance with this invention.

*Step 1.*—A 70% aqueous solution of trimethylolphenol, a one step phenolic resin or resol obtained under brand No. BRLA 1030 from the Bakelite Company, 30 E. 42nd Street, New York 17, New York, is mixed with 4.5% by weight of diallyl phthalate, and the mixture is dehydrated to a water content of less than 8% utilizing the apparatus for and method of removing water from phenol resins as disclosed in my copending application, Serial No. 682,173, filed September 5, 1957. In this process, the trimethylolphenol is heated to a temperature in the range of 140–150° F. and hot dry air is bubbled through the mixture to extract the water and other volatiles present.

*Step 2.*—At 150° F., 35 parts by weight of the dehydrated trimethylolphenol and diallyl phthalate mixture are blended with 65 parts by weight of phenol formaldehyde novolak resin obtained under brand No. BRLA 7541 from the Bakelite Company.

*Step 3.*—Maintaining the above blend at 150° F., 0.6% by weight of magnesium oxide catalyst based on the blend is added. If desired, any suitable coloring agent is dispersed in the blend. Phenyl or allyl glycidol ether, or styrene oxide may be employed as a vehicle for both the coloring agent and the catalyst. Finally, 15% by weight of asbestos filler and, if desired, 0.5% by weight of aluminum or calcium stearate mold release is added.

The above resin preparation is sufficiently fluid at 150° F. that it may be conveniently applied to glass fiber sheet stock by conventional means. Suitable techniques for applying the resin preparation to glass fibers so as to form pre-impregnated glass fiber sheet stock are described in my copending application, Serial No. 732,- 323, filed May 1, 1958, and entitled Reinforced Continuous Sheeting and the Method and Apparatus for Making Same.

After impregnation of the sheet stock and subsequent cooling to room temperature, the resin is a viscous solid such that the pre-impregnated resin and glass fiber sheets may be conveniently handled. The pre-impregnated sheets are substantially non-tacky although they are pressure sensitive when stacked or laminated in contact. Such pre-impregnated sheets have a shelf life of six to twelve months at room temperature.

The resin, when prepared as described above, polymerizes under pressure at about 300° F. At temperatures materially below those at which polymerization takes place the resin has essentially thermoplastic properties.

In the above described procedure for preparing a phenol formaldehyde resin, diallyl phthalate was added in a trimethylolphenol dehydration step. This addition is beneficial in two respects. First, it reduces the viscosity of the trimethylolphenol resin, thus facilitating water removal. Second, it reduces the rate of advancement of the trimethylolphenol resin during the water extraction operation.

The addition of 4.5% diallyl phthalate to the 70% aqueous solution of trimethylolphenol results in a final concentration of approximately 2% by weight of diallyl phthalate in the final 65:35 blend of formaldehyde novolak with partially dehydrated trimethylolphenol.

In practice, a concentration of diallyl phthalate in the final phenol formaldehyde resin blend anywhere in the range 1 to 4% by weight of the blend is found satisfactory. This range corresponds approximately to a concentration range of 2 to 10% by weight of diallyl phthalate in the original 70% aqueous solution of trimethylolphenol. A higher concentration of diallyl phthalate leads to a final resin blend which remains undesirably tacky before curing and which has a slow cure cycle.

While the beneficial use of diallyl phthalate has been described in connection with a specific commercially prepared phenol formaldehyde resin, it is to be understood that the practice of this invention is not limited to such resin preparations and that the application of the techniques disclosed herein to other phenol formaldehyde resin preparations is deemed within the purview of one skilled in the art.

Although the preferred embodiment of the process has been described, it will be understood that within the purview of this invention various changes may be made in the form, proportion and ingredients and the combination thereof, which generally stated consist in a method and a compound capable of carrying out the objects set forth, as disclosed and defined in the appended claims.

Having thus described my invention, I claim:

1. A thermosetting resin composition including a blend of about 65 parts by weight of phenol formaldehyde novolak, about 35 parts by weight of aqueous trimethylolphenol, and from about 1 to 4% of diallyl phthalate monomer based on the weight of the blend.

2. The combination according to claim 1, wherein the trimethylolphenol component includes less than 8% by weight of water.

3. In a thermosetting resin composition, the combination including 35 parts by weight of a mixture including trimethylolphenol in an initially 70% aqueous solution which together with about 4.5% by weight of diallyl phthalate monomer has been dehydrated to a water content of less than 8% by weight, and 65 parts by weight of phenol formaldehyde novolak.

4. A thermosetting resin comprising a blend of about 65 parts by weight of a phenolic novolak, about 35 parts by weight of a phenolic resol containing less than 8% water by weight, and about 1–4% diallyl phthalate monomer based on the weight of the blend.

5. A thermosetting resin comprising a blend of about 65 parts by weight of a phenolic novolak, about 35 parts by weight of a phenolic resol, and about 1 to 4% diallyl phthalate monomer based on the weight of the blend.

References Cited in the file of this patent

UNITED STATES PATENTS

| | | |
|---|---|---|
| 2,168,981 | Flood et al. | Aug. 8, 1939 |
| 2,321,783 | Webber et al. | June 15, 1943 |
| 2,830,925 | Fennebresque et al. | Apr. 15, 1958 |

FOREIGN PATENTS

| | | |
|---|---|---|
| 1,009,489 | France | Mar. 12, 1952 |